Feb. 24, 1970    J. K. BRUCE ET AL    3,496,969

VALVE FOR PRESSURIZING A CONTAINER

Filed May 12, 1967

JOHN K. BRUCE
THEODORE R. BRUCE
INVENTOR.

BY R. E. Geauque
ATTORNEY

United States Patent Office 3,496,969
Patented Feb. 24, 1970

3,496,969
VALVE FOR PRESSURIZING A CONTAINER
John K. Bruce, Burbank, and Theodore R. Bruce, Pasadena, Calif., assignors to Sterigard Company, Burbank, Calif., a California limited partnership
Filed May 12, 1967, Ser. No. 638,119
Int. Cl. B65b 3/04
U.S. Cl. 141—20                                              4 Claims

ABSTRACT OF THE DISCLOSURE

A valve for pressurizing a container which comprises a plurality of thicknesses of material that can be penetrated by a propellant loading needle inserted through an opening in the wall of the container into a propellant cavity. One of the thicknesses consists of a self-healing, essentially uncured rubber and the other thicknesses are located on opposite sides of the self-healing rubber to cover same at the location where the needle is inserted.

---

This invention relates to a valve for pressurizing a container and more particularly to a valve which is secured to the interior wall of a container and covers an opening in the wall through which a needle can be inserted to discharge a propellant into the interior of the container.

It has been proposed to load the product to be dispensed in one end of a container and to load a propellant in the opposite end of the container and to divide the two from one another by a piston or diaphragm. The propellant can be loaded into the propellant compartment of the container by inserting propellant through an opening in the can and thereafter sealing the opening. The propellant can be inserted through an unobstructed opening and a seal or plug can be inserted into the opening after loading of the propellant. In co-pending U.S. application Ser. No. 548,963 filed May 10, 1966 by John K. Bruce and Theodore R. Bruce and assigned to the same assignee, now U.S. Patent No. 3,393,842, the propellant is injected into the container through a deposit or valve on the interior of the container consisting of a catalyzed polyester rubber compound. The valve is located over an opening in the container and the propellant is injected into the container with a needle which passes through the opening and penetrates the valve.

By the present invention, a laminar self-sealing valve or loading valve through which a needle can be inserted is provided which is formed of a plurality of layers of rubber-like material. The top and bottom layers can be formed of natural or synthetic rubber, while at least one of the interior layers is formed of material having self-healing properties, such as uncured (raw) rubber which has excellent self-healing characteristics. The bottom layer serves to attach the valve to the interior of the container over the loading opening and prevents extrusion of the uncured rubber layer through the loading opening after the container is pressurized. The outer layer of natural or synthetic rubber serves to prevent the raw, uncured rubber from following the needle into the container and provides a resealing pressure area on the uncured rubber layer. The intermediate, uncured rubber layer immediately self-seals as the needle is withdrawn from the valve to provide a positive seal against loss of propellant. The top and bottom layers also prevent curing of the uncured rubber layer at its center area which is penetrated by the needle so that the container can be stored before propellant injection without loss of self-healing properties. Thus, the valve of the present invention permits the use of a large needle and a larger loading opening in the container so that the propellant can be more quickly loaded into the container. Also, because of the use of uncured rubber in the valve, the needle will penetrate the valve more easily without damage to the valve.

It is therefore an object of the present invention to provide a valve for pressurizing a container which permits the insertion and withdrawal of a propellant loading needle through a wall opening of the container and provides an effective propellant seal thereafter.

Another object of the invention is to provide a valve for pressuring a container, which valve is penetrated by a propellant loading needle and has an uncured rubber portion which quickly reseals the valve after the needle is withdrawn.

These and other objects of the invention not specifically set forth above will become readily apparent from the following description and claims in which:

Figure 1:
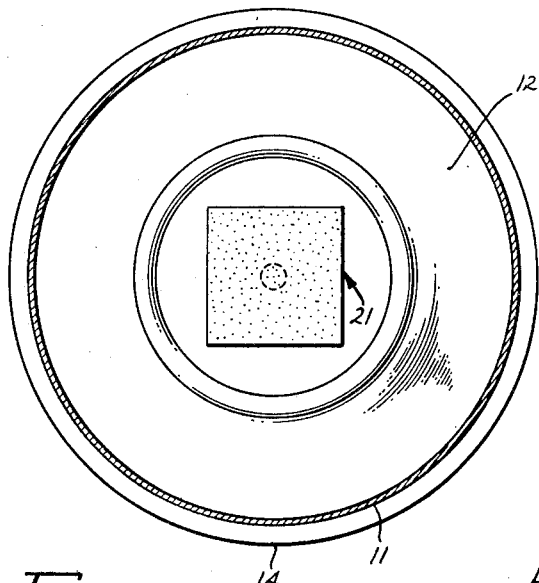
FIGURE 1 is a horizontal section of a container showing in elevation the bottom wall and valve attached thereto over the propellant loading opening in the bottom wall.

Referring to the embodiment of the invention chosen for purposes of illustration only, the container 10 comprises a cylindrical side wall 11 and a bottom closure wall 12 which is substantially dome shaped. The wall 12 is seamed to the end of side wall 11 to form the usual bead 14 around the bottom of the can. It is understood that the top wall (not shown) of the can can be attached to the cylindrical wall 11 in the same manner as the bottom wall 12 and can contain a dispensing valve for discharging the contents of the container. The seam (not shown) between the top wall and the cylindrical wall 11 can also serve to retain a thin plastic liner 15 within the container and this liner can be charged with the material 16 to be stored within the can.

In order to discharge material 16 through the top wall of the can, a propellant is injected into the cavity or space 17 between the bottom wall 12 and the liner 15. The bag 15 is preferably formed of a thin flexible tube of a suitable plastic, such as polyethylene, and preferably has an arch configuration at the bottom end thereof to avoid the propellant needle. However, it is understood that the liner 15 can be replaced by a piston or other type of diaphragm which can be moved within the container by the propellant in order to force the material 16 through the dispensing valve in the top wall of the container. Any shape and construction of container can be utilized with the present invention.

Figure 2:
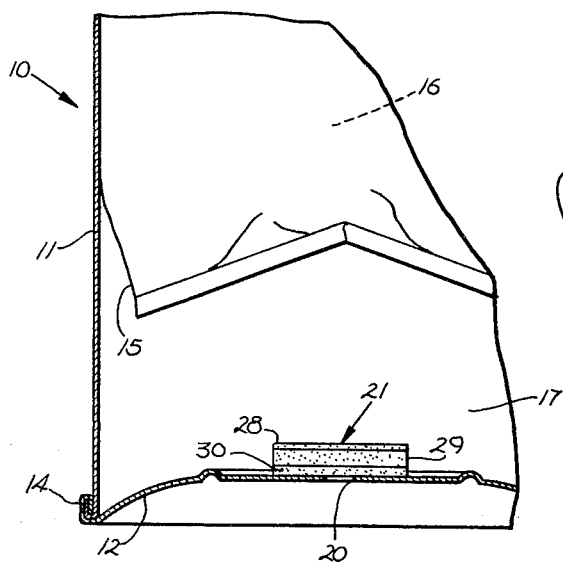
FIGURE 2 is a partial vertical section of the container of FIGURE 1 with the valve in elevation and showing the cylindrical side wall of the container and the inner flexible liner below which is located the pressurizing cavity for the can.
Figure 4:
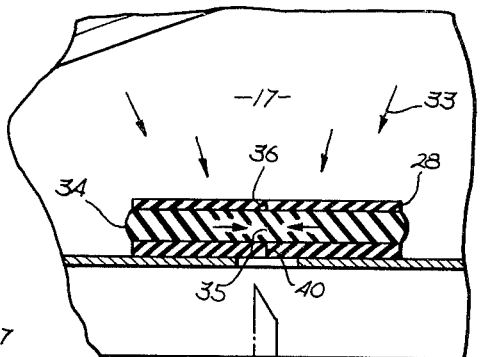
FIGURE 4 is a vertical section similar to FIGURE 3 showing the valve after the needle has been withdrawn and illustrating the manner in which the valve quickly reseals.

Referring to FIGURE 2, the bottom section or wall 12 contains a loading opening 20 and this opening is covered by a valve 21 secured to the interior surface of the wall over the opening. The propellant is inserted into propellant compartment 17 by a needle 22 which passes through the opening 20 and then through the valve 21 until the end 23 of the needle enters into the compartment. The needle can be carried at the end of a ram 24 which is movable towards and away from the bottom wall 12 of the container. This ram can be a part of automatic equipment which is utilized to fill the liner 15 with the product.

Any suitable type of liquid or gas propellant can be used, such as C318 type Freon. Preferably, the Freon introduced into the needle 22 is under pressure so that it remains a liquid at usual room temperature. After the propellant is introduced under pressure and in liquid form into the space 17, a portion will evaporate or gasify in the cavity 17 until a pressure of approximately 23 p.s.i. is reached at an ambient temperature of 70° F., and thereafter evaporation will cease. It is understood that the final pressure developed in the container for a given propellant charge will depend upon the ambient temperature. It is understood that the type of propellant and the quantity of propellant can be varied to meet the particular container and product characteristics.

As the product 16 is dispensed from the container by the pressure of the propellant in the cavity 17, the cavity 17 will of course enlarge and additional liquid propellant will evaporate in order to maintain 23 p.s.i. pressure of the Freon at an ambient temperature of 70° F. If the cavity becomes so large that all of the liquid propellant is gasified, the pressure will then drop in the cavity as additional product is dispensed.

Referring now to the structure of the valve 21, the valve comprises a top layer or thickness 28, a middle layer or thickness 29 and a bottom layer or thickness 30, all continuous and substantially planar and of the same square shape. The top and bottom layers are produced from sheets of natural or synthetic rubber preferably having a Shore hardness of between 45 to 55. It is preferable that the bottom layer be approximately twice as thick as the top layer for reasons to be presently discussed although this thickness relationship can be varied. The middle layer 29 is fabricated of uncured rubber which is self-sealing after penetration. Uncured rubber is sometimes known as raw rubber and has only a trace of sulphur curing agent so that it maintains its rehealing and self-sealing qualities. The uncured rubber layer is normally the thickest layer in order to provide sufficient resealing area. In one suitable structure, the top layer and bottom layer had thicknesses of $1/32$ of an inch and $1/16$ of an inch, respectively, and the middle layer had a thickness of $3/32$ of an inch.

Figure 3:
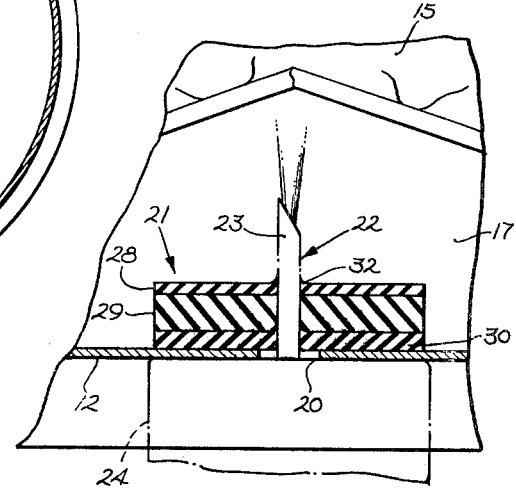
FIGURE 3 is an enlarged, partial vertical section of the container of FIGURE 2 taken through the valve and showing the valve penetrated by the propellant needle.

Referring now to the function of each of the layers, the top layer 28 of natural or synthetic rubber serves to prevent the raw uncured rubber 29 from following the needle into the propellant cavity 17 as the needle is inserted into the position of FIGURE 3. It will be noted that a lip 32 develops in the upper layer 28 around the needle and serves to hug the needle and hold the raw rubber layer in place. After the needle is withdrawn, the top layer covers the raw rubber layer and transfers pressure within the cavity 17, represented by the arrows 33, to the middle layer 29. This pressure on the top layer causes the middle layer to bulge outward along its side edge 34 and also to bulge toward the center line 35 from which the needle 22 has been withdrawn. Because of the rehealing characteristics of the raw rubber and because the pressure transmitted to the raw rubber by the propellant in cavity 17, a complete and quick resealing of the raw rubber occurs after withdrawal of the needle 22, even though a nonsealing line 36 remains in the top layer 28. Also, the top sheet prevents curing of the uncured raw rubber at the center where the needle passes, even though some curing can occur around the edge 34 where the layer 29 will be subjected to the gas within the cavity and heat.

The middle layer 29 of raw rubber is preferably the thickest layer and provides the main seal for opening 20 after the needle 22 has been withdrawn. The thickness of the layer is such as to provide sufficient sealing area to permit the use of a relatively large injection needle 22. The bottom sheet 30 is thick enough and large enough to prevent the raw rubber 29 from extruding out through the bottom opening 20 under the pressure in the propellant cavity after the cavity has been loaded. Also, the bottom layer provides a smooth structural surface to bond to the bottom wall 12 of the container so that a strong seal can be provided between the valve 21 and the container wall 12. The bottom layer also prevents the raw rubber of layer 29 from following the needle out of the container opening 20 as the needle is withdrawn. A non-sealing line 40 remains in the bottom layer after the needle is withdrawn. Any suitable adhesive can secure the bottom layer 30 to the bottom wall 12 and the layers can be secured together by means of any suitable bonding agent. In general, the outer layers are the confining layers for the intermediate, self-healing layer.

The valve 21 provides a means for continually sealing an opening in the wall of any container and permits the insertion of a needle through the wall without the propellant escaping after the needle is withdrawn. The immediate sealing is accomplished by the raw rubber layer located between the top and the bottom layers of natural rubber. If desired, a number of raw rubber layers could be laminated between natural rubber layers to provide an increased sealing effect. Also, the size of the valve 21 can be varied so long as the valve confines the propellant within the propellant space after the needle is withdrawn. It is understood that the valve can have any desired shape to fit against the inside wall of the container and that all the layers need not be the same size and shape. Also, other materials can be used for the individual layer which serves the same function. For instance, the natural rubber layers can be replaced by material which confines and holds the sealant material and serves the other purposes of the natural rubber layers. The valve of the present invention can be used generally for charging a propellant into a container, whether or not this propellant is maintained separate from the product after it is placed in the container.

What is claimed is:

1. In combination with a container for a pressure-dispensed product of the type having a hole in a wall thereof for the passage of a propellant injection needle into the interior of the container for the charging of the container with a pressurizing propellant, an improved valve for sealing the hole comprising:
   (a) a bottom continuous and substantially planar layer composed of rubber-like material having a Shore hardness of from between about 45 to about 55 bonded to the inner surface of the wall over the hole;
   (b) an intermediate continuous and substantially planar layer composed of self-healing material disposed over the bottom layer;
   (c) a top continuous and substantially planar layer composed of rubber-like material having a Shore hardness of from between about 45 to about 55 disposed over the intermediate layer;
   (d) the bottom, intermediate and top layers defining a laminar self-sealing valve having the lateral periphery of the intermediate layer exposed to the interior of the container;
   (e) the bottom layer preventing extrusion of the intermediate layer through the hole and the withdrawal of the intermediate layer through the hole with the injection needle; and
   (f) the top layer preventing curing of the intermediate layer which it is over, the intermediate layer from following the injection needle as it passes beyond the top layer into the container interior and transmitting the compressive pressure of propellant in the container interior to the intermediate layer to cause the latter to close the hole produced by the passage of the injection needle.

2. The combination claimed in claim 1 wherein:
   (a) the top and bottom layers are composed of natural rubber; and
   (b) the intermediate layer is composed of raw, uncured rubber.

3. In combination with a container for a pressure-dispensed product of the type having a thin plastic bag within the container to separate the product from a pressurizing propellant by dividing the container interior into a product chamber and a propellant chamber, the container having a hole in the wall thereof for the passage of a propellant injection needle into the propellant chamber to charge the propellant chamber with propellant, an improved valve for sealing the hole comprising:
- (a) a bottom continuous and substantially planar layer composed of rubber-like material having a Shore hardness of from between about 45 to about 55 bonded to the inner surface of the wall over the hole;
- (b) an intermediate continuous and substantially planar layer composed of self-healing material disposed over the bottom layer;
- (c) a top continuous and substantially planar layer composed of rubber-like material having a Shore hardness of from between about 45 to about 55 disposed over the intermediate layer;
- (d) the bottom, intermediate and top layers defining a laminar self-sealing valve having the lateral periphery of the intermediate layer exposed to the propellant chamber;
- (e) the bottom layer preventing extrusion of the intermediate layer through the hole and the withdrawal of the intermediate layer through the hole with the injection needle; and
- (f) the top layer preventing curing of the intermediate layer which it is over, the intermediate layer from following the injection needle as it passes beyond the top layer into the propellant chamber and transmitting the compressive pressure of propellant in the propellant chamber to the intermediate layer to cause the latter to close the hole produced by the passage of the injection needle.

4. The combination claimed in claim 3 wherein:
- (a) the top and bottom layers are composed of natural rubber; and
- (b) the intermediate layer is composed of raw, uncured rubber.

References Cited

UNITED STATES PATENTS

| | | | |
|---|---|---|---|
| 2,387,455 | 10/1945 | McDermott | 137—223 X |
| 2,757,843 | 8/1956 | Smith | 141—329 X |
| 3,007,483 | 11/1961 | Keefe | 137—223 |
| 3,100,498 | 8/1963 | Gibson | 137—223 |

HOUSTON S. BELL, JR., Primary Examiner

U.S. Cl. X.R.
137—223; 141—329